United States Patent [19]

Collins et al.

[11] Patent Number: 5,230,449

[45] Date of Patent: Jul. 27, 1993

[54] COLLAPSABLE BICYCLE CARRIER FOR VEHICLES

[76] Inventors: John G. Collins, P.O. Box 101, New Baltimore, N.Y. 12124; Steven I. Cass, 115 North St., Saratoga Springs, N.Y. 12866

[21] Appl. No.: 747,986

[22] Filed: Aug. 21, 1991

[51] Int. Cl.⁵ ............................................. B60R 11/00
[52] U.S. Cl. ............................ 224/42.03 B; 224/318; 410/3; 410/96
[58] Field of Search ............... 224/42.03 R, 42.03 B, 224/321, 42.42, 42.46, 309, 318, 329; 410/3, 4, 7, 10, 11, 12, 21, 23, 96, 97, 99, 100; 248/499, 500, 503

[56] References Cited

U.S. PATENT DOCUMENTS

| | | | |
|---|---|---|---|
| 2,908,522 | 10/1959 | Glave | 248/503 X |
| 3,464,608 | 9/1969 | Rodriguez | 224/42.03 B |
| 3,923,221 | 12/1975 | Ballinger | 224/42.03 B |
| 4,039,106 | 8/1977 | Graber | 224/29 |
| 4,085,874 | 4/1978 | Graber | 224/29 |
| 4,116,341 | 9/1978 | Hebda | 224/42.03 B X |
| 4,253,594 | 3/1981 | Parks | 410/97 X |
| 4,386,709 | 6/1983 | Graber | 211/20 |
| 4,394,948 | 7/1983 | Graber | 224/314 |
| 4,518,108 | 5/1985 | Allen | 224/314 |
| 4,726,499 | 2/1988 | Hoerner | 224/329 X |
| 5,038,980 | 8/1991 | Baldeck | 224/42.03 B |
| 5,065,921 | 11/1991 | Mobley | 224/329 X |

FOREIGN PATENT DOCUMENTS

2355694  2/1978  France .
2452623 11/1980  France ................................ 410/12

Primary Examiner—Henry J. Recla
Assistant Examiner—Glenn T. Barrett
Attorney, Agent, or Firm—Kevin R. Kepner

[57] ABSTRACT

A collapsable bicycle carrier for a vehicle which utilizes the structure of the bicycle frame for its support and is easily adaptable to virtually any vehicle. The carrier uses soft, flexible straps and non-metallic attaching devices to prevent damage to the vehicle or the bicycle. The straps are long enough and are provided with quick release and slide buckles to allow versatility in mounting to various vehicles.

3 Claims, 9 Drawing Sheets

COLLAPSABLE BICYCLE CARRIER FOR VEHICLES

BACKGROUND OF THE INVENTION

The present invention relates to bicycle accessories and more particularly to a portable, collapsable apparatus for mounting and carrying a bicycle on the rear of an automobile or other similiar vehicle.

Automobile bicycle carriers that can carry bicycles on the rear of a vehicle and can be easily removed are known. Many of the carriers that are known consist typically of a lightweight metal frame which is removably attached to a vehicle. With these types of carriers it is somewhat difficult to remove the carrier and the bulky nature of the carrier limits the ease of storing and transporting the carrier.

Carriers as described above are shown in U.S. Pat. Nos. 4,518,108, 4,085,874, 4,394,948, 4,386,709 and 4,039,106. All of these type carriers consist of a multitude of parts and require tools and various fastening devices to attach them to the vehicle. Additionally, the metal components are a potential source of scratching the vehicle or the bicycle to which they are attached and are also susceptable to corrosive damage.

A foldable, more portable carrier is described in Ballinger U.S. Pat. No. 3,923,221. The Ballinger patent however still uses metal components to attach to a vehicle and further is difficult to use and lacks stability in securing the bicycle to the vehicle. Further, the Ballinger configuration is not easily adapted to various sized and shaped vehicles. A prior abandoned application by one of the inventors herein attempted to address the problems described but was unsuccessful.

It is these various shortcomings of the currently available carriers to which the present invention is addressed.

SUMMARY OF THE INVENTION

The present invention consists of a portable, attractive bicycle carrier capable of being adapted to virtually any vehicle and does not require any tools or fasteners for attachment to a vehicle.

It is a further objective of the present invention to eliminate all exposed metal components so as to virtually eliminate to potential for scratching of the carrier vehicle or the bicycle and to also eliminate sources of potential corrosion.

The present invention consists of a set of soft nylon webbing straps incorporating quick release, adjustable plastic cain buckles, two velcro straps, one pedal/sprocket pad and one "s" hook used to attach a bicycle to a vehicle in the following manner. The two velcro straps are used to secure the brake handles to lock the wheels. The pedal/sprocket pad is attached to the pedal adjacent to the vehicle. The two long upper attachment straps are inserted in the upper hatch/trunk opening. The two y-shaped yokes are positioned at the lower hatch/trunk opening aligned with the center of each bicycle wheel and the lid is closed. The lower pedal strap is fastened under the vehicle at a secure location, i.e. tow hook, bumper, etc.

The bicycle is then placed into the enclosed rigid j-hooks in the yokes with the inner pedal in an upward position. The bicycle is held against the vehicle and the upper attachment straps are secured to the seat post and steering stem. The lower pedal strap is attached to the outside pedal and pulled tight to hold the wheels against the vehicle. The upper straps are then tightened snugly to hold the inner pedal and pad against the vehicle and the bicycle is secure.

As a result of the use of the quick release adjustable buckles the straps can be adapted to virtually any vehicle. The compactness and light weight of the components allow the carrier to be transported on the bicycle itself or even on a person.

These and further advantages and objectives of the present invention will become apparent to those skilled in the art from a consideration of the following and detailed description of the invention.

DETAILED DESCRIPTION OF THE INVENTION

Figure 1:
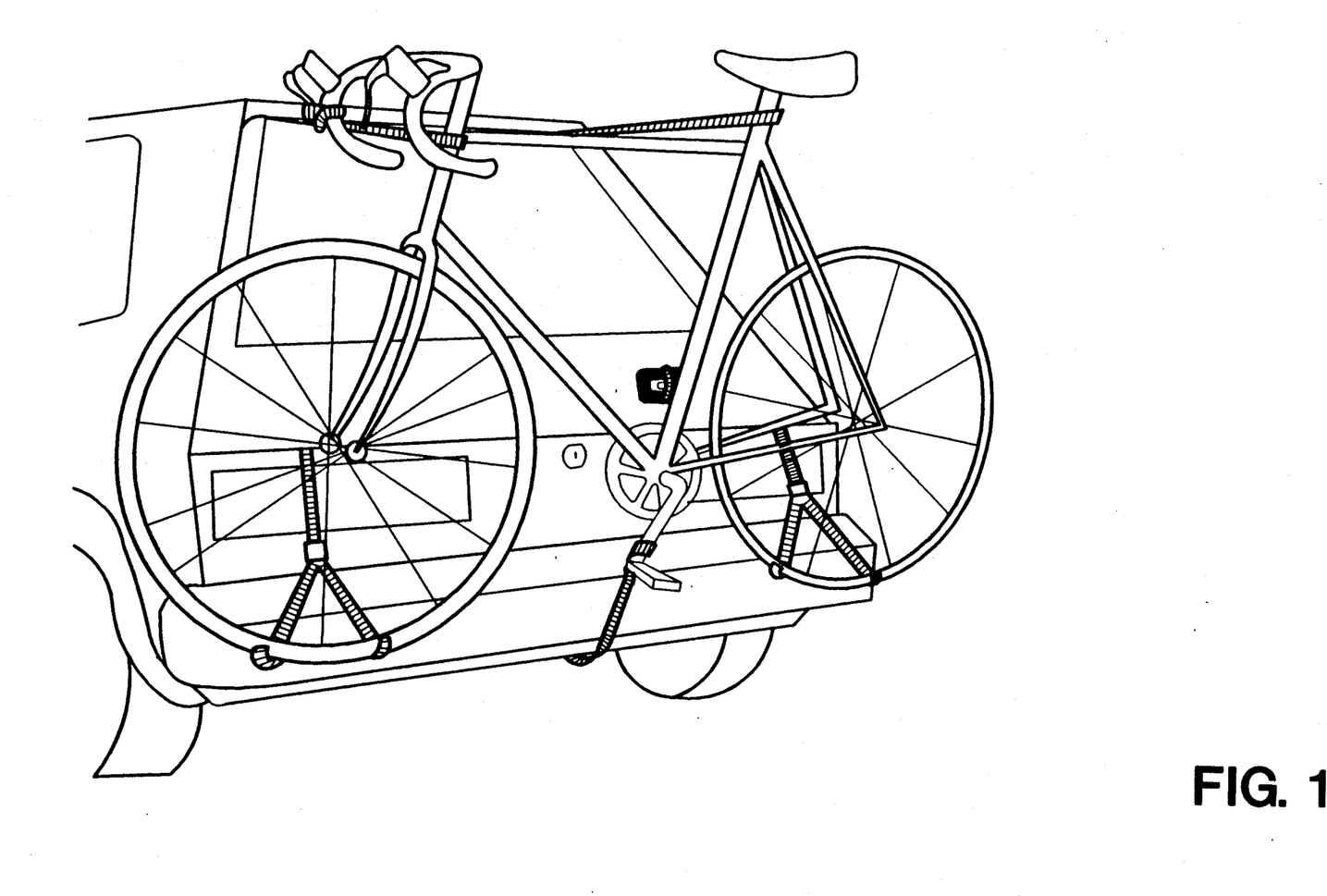
FIG. 1- is a perspective view of the preferred embodiment of the present invention attaching a bicycle to a vehicle FIG. 2- is a plan view of the invention attached to a hatchback model vehicle.
Figure 2:
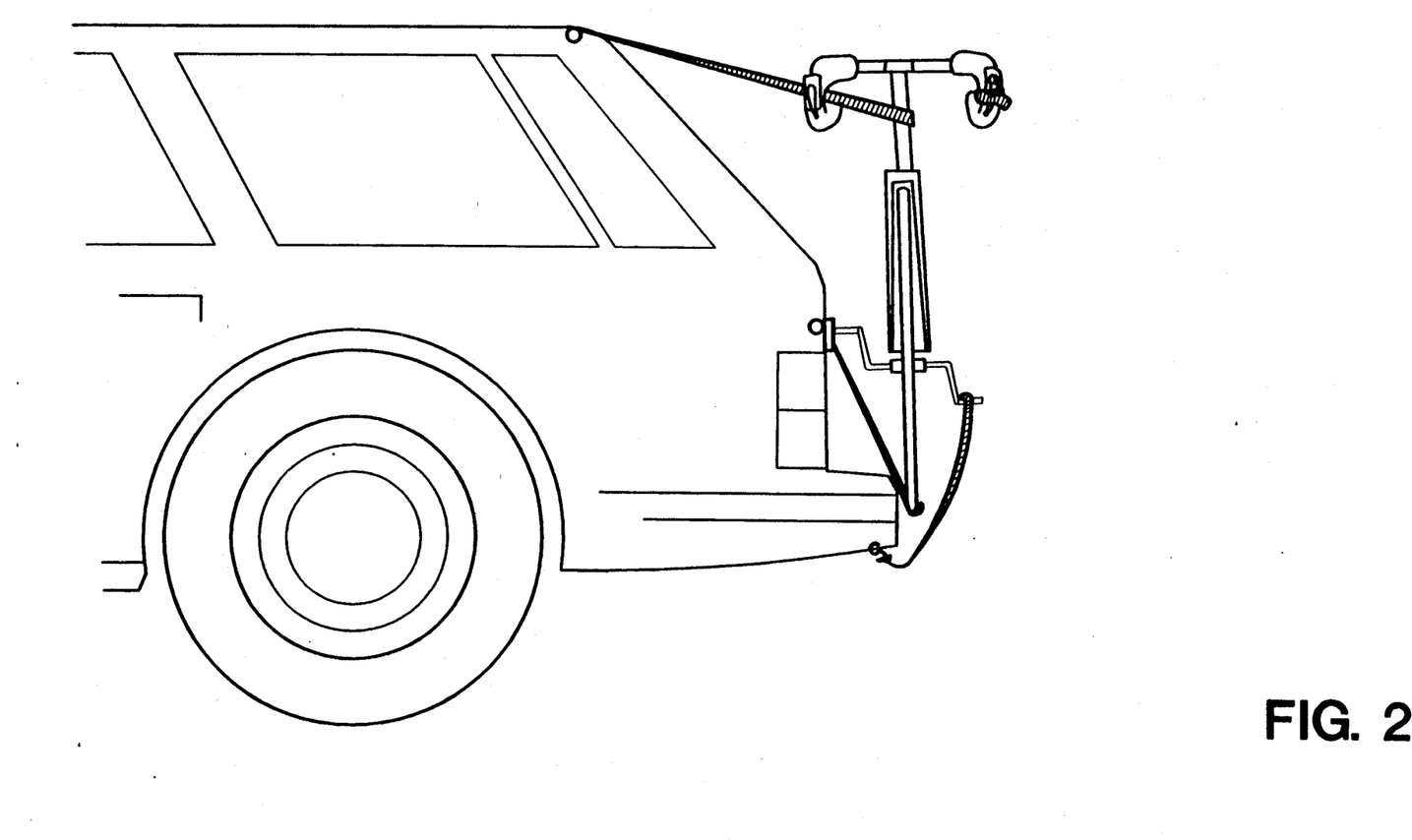
Figure 3:
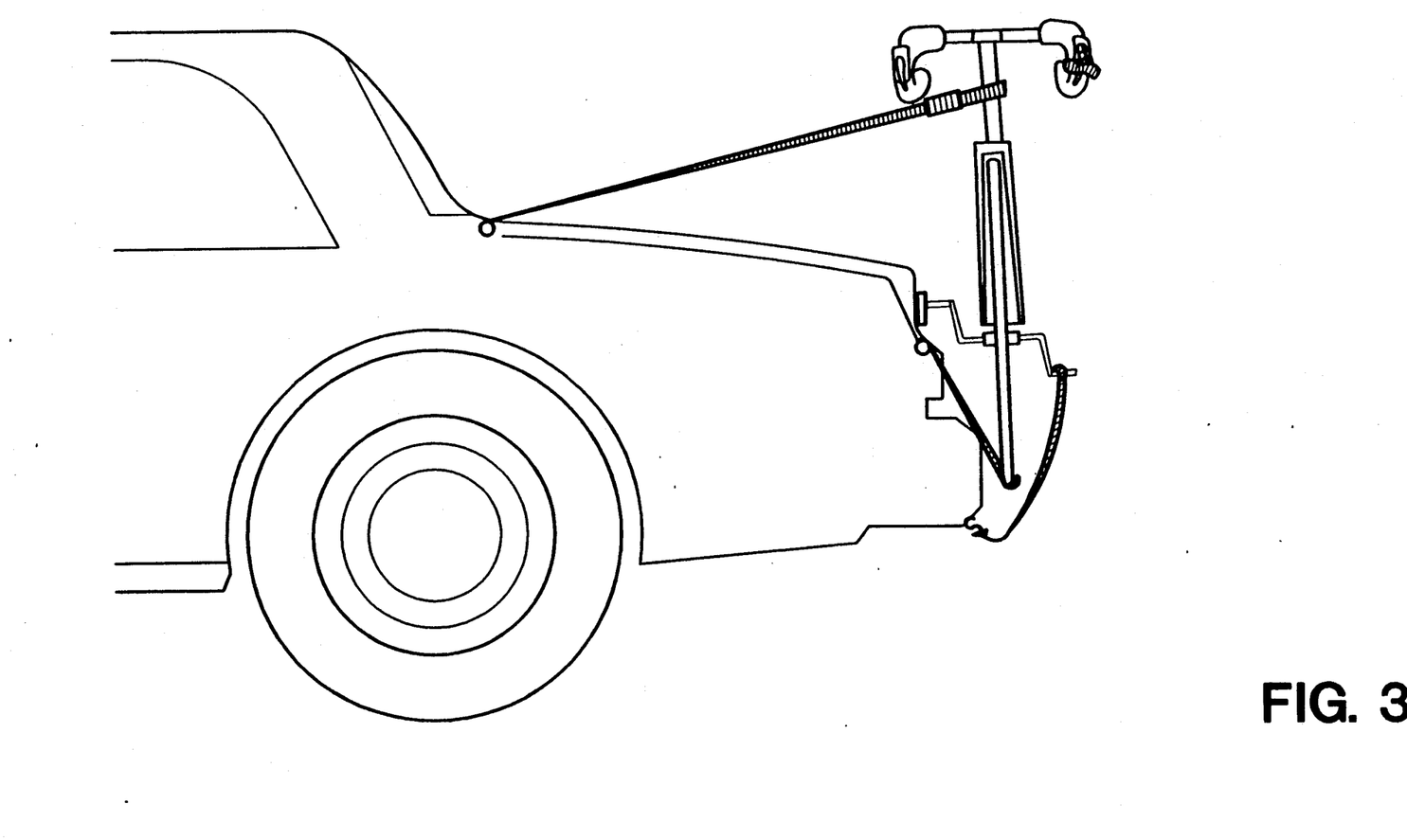
FIG. 3- is a plan view of the invention attached to a standard trunk model vehicle FIG. 4- is a perspective view of one of the lower wheel support straps FIG. 5- is a perspective view of one of the upper adjustable attachment straps FIG. 6- is a perspective view of the lower pedal attachment strap FIG. 7- is a perspective view of the brake lock FIG. 8- is a perspective view of the protective pedal pad FIG. 9- is a perspective view of the lower strap bumper attachment hook
Figure 4:
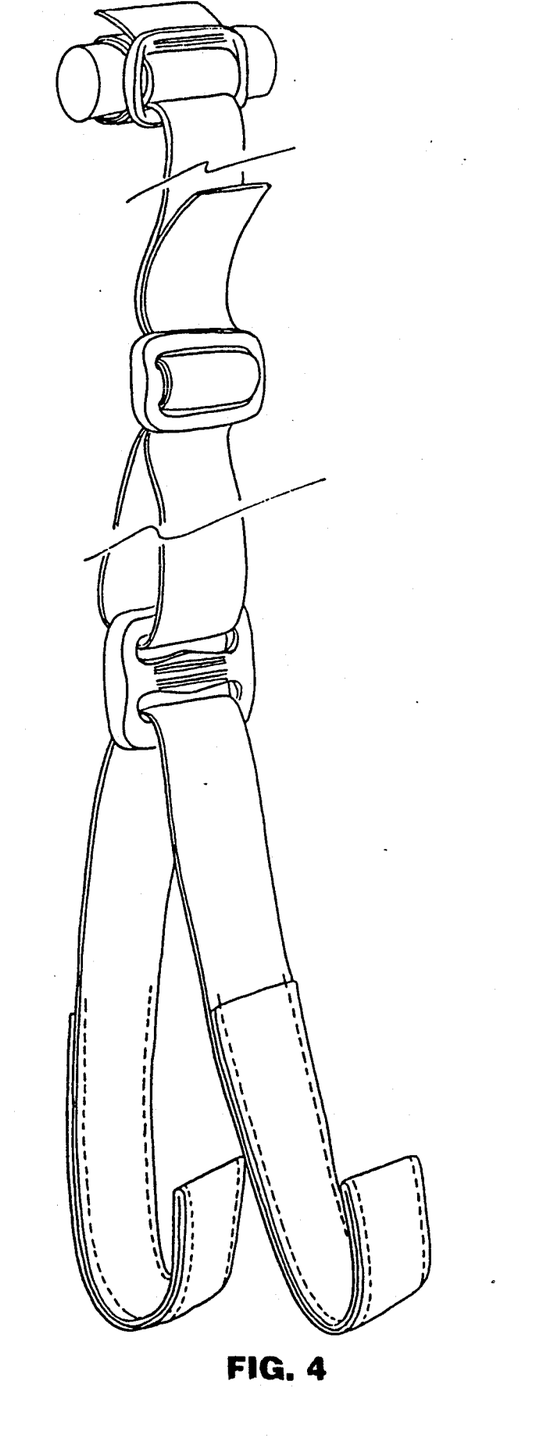
Figure 5:
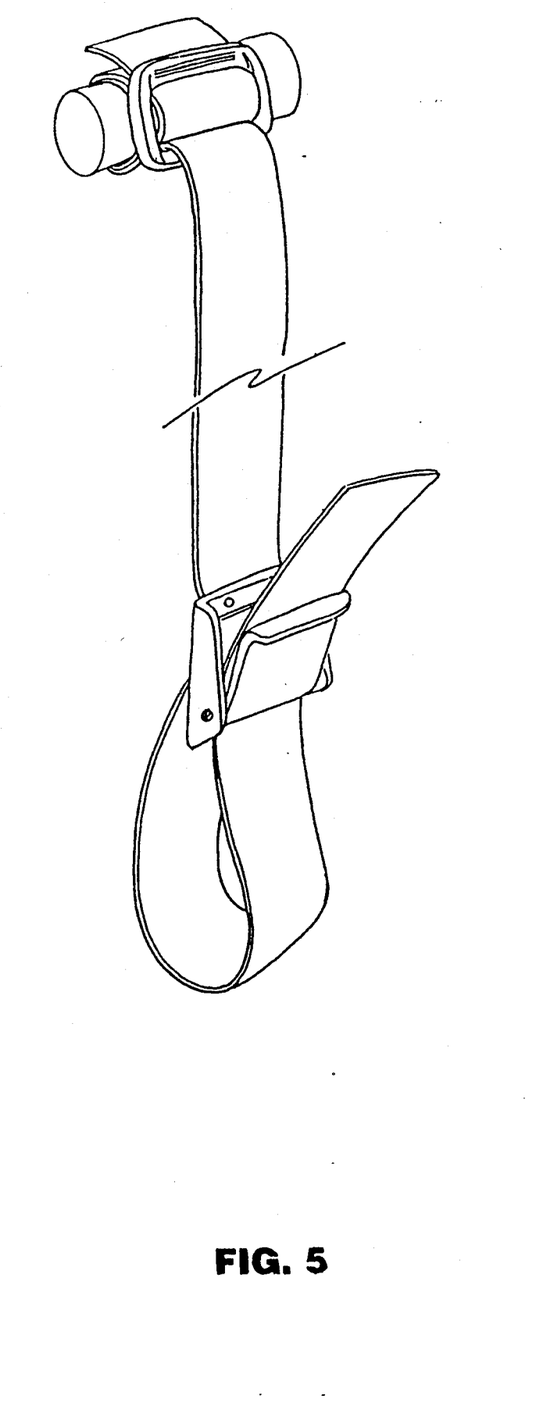
Figure 6:
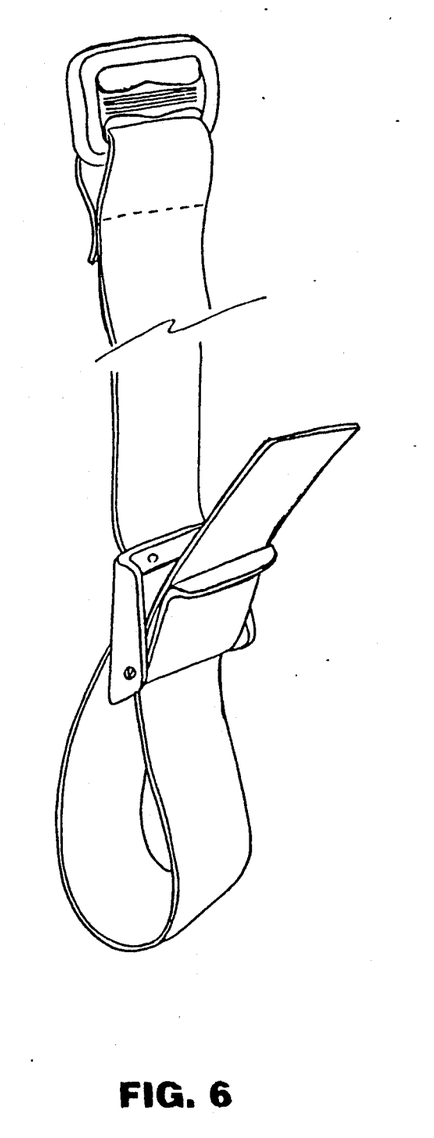
Figure 7:
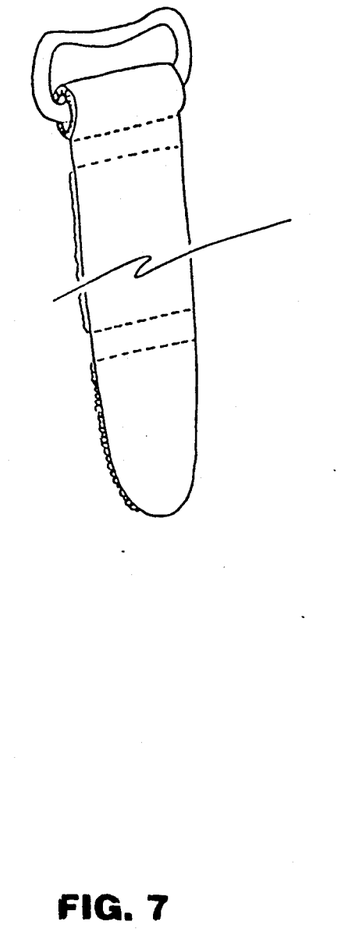
Figure 8:
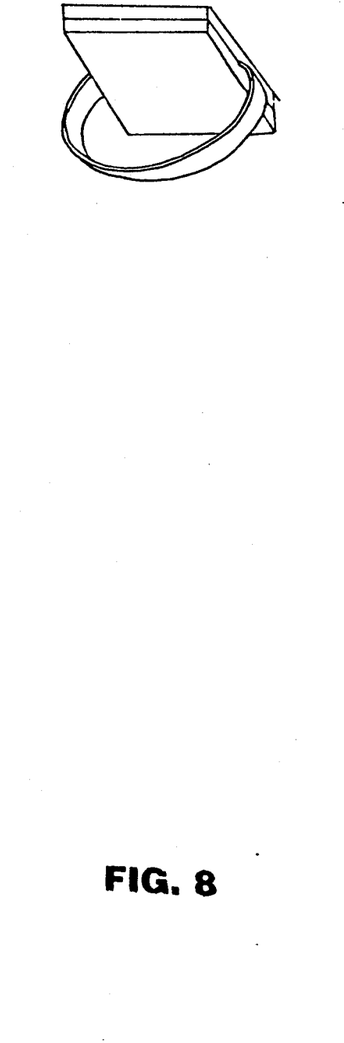
Figure 9:
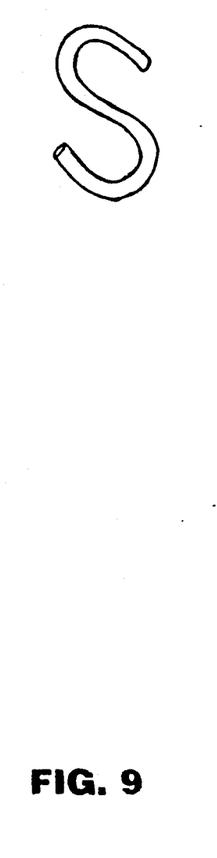

The collapasable bicycle carrier of the current invention is illistrated in FIG. 1, FIG. 2 and FIG. 3 attached to a vehicle with a bicycle suspended. As shown in these figures the bicycle wheels are supported by a pair of Y-shaped strap assemblies 2 which are secured in the lower trunk-hatch opening section having a shaped wheel hook 4 formed into the strap section 3. The upper portion of the bicycle is supported by strap sections 1 which are likewise secured in the upper trunk-hatch opening by the cyclinders 11 and which straps are then looped around the seat post and head tube or other convenient portion of the bicycle frame and tightened by means of a quick release buckle 10. A pedal pad 7 is attached to the inward pedal and provides a fulcrum point at the rear of the vehicle. The outward pedal is then placed in the loop of the lower pedal strap 5 and the free end of the strap 12 is secured to the bumper by means of a hook 13. The lower strap 5 is then tightened by means of the quick release buckle 10. A brake lock strap 6 is affixed around the hand brake handles to prevent the wheels from rolling out of the wheel hooks 4.

Detailed drawings of the strap assemblies are set forth in FIGS. 4, 5, 6 and 7. As can be seen in these figures, by providing a relatively long attachment strap and providing adjusting buckles 9, the carrier can be configured to fit virtually any vehicle.

Since certain changes in the foregoing disclosure are readily apparent without departing from the scope of the invention herein described, the foregoing disclosure is intended to be construed in an illustrative sense and not in any manner a limiting sense.

What is claimed:

1. A collapsable bicycle carrier for use on a vehicle having a body and a hatch cover and adapted for carrying a bicycle having a pair of wheels and a frame, said carrier comprising:

a plurality of adjustable flexible lower support straps, each of said lower support straps having at least three legs, a first leg of each of said lower support straps being adapted to be removably affixed to said vehicle hatch cover and a second and a third leg of each of said lower support straps being adapted to be removably affixed to a wheel on said bicycle;

a plurality of adjustable flexible upper support straps, each of said upper support straps being adapted to be removably affixed at a first end to said vehicle hatch cover and adapted to be removably affixed at a second end to an upper portion of said frame of said bicycle;

an adjustable pedal pad adapted to be removably affixed to a pedal on said bicycle immediately adjacent to said vehicle, such that said pad is adapted to contact both said pedal and a surface on said vehicle;

an adjustable lower pedal support strap adapted to be removably affixed at a first end to a non-adjacent pedal on said bicycle and adapted to be removably affixed at a second end to a secure attachment point on a lower portion of said vehicle; and an adjustable brake lock device.

2. A collapsible bicycle carrier as described in claim 1 wherein:

each of said adjustable lower support straps is configured in an inverted Y shape and wherein said first leg comprises a flexible cylindrical section affixed to said first leg at one end with a diameter significantly greater than a space between the body of the vehicle and the hatch cover and wherein each of said second and third legs includes a substantially "J" shaped section of rigid material formed therein; and wherein adjustment of said straps is accomplished with a standard slide buckle;

each of said upper support straps are configured in a manner wherein said first end comprises a flexible cylindrical section affixed thereto with a diameter significantly greater than a space between said body of said vehicle and sad hatch cover and wherein said second end is adapted to be attached to the bicycle frame by way of a slide buckle through which said second end is slidably attached;

said adjustable brake lock device comprises a strap and securing means adapted to encircle a brake handle;

said lower pedal support strap is configured in a manner wherein an "S" hook is removably affixed to said second end and said first end is slidably attached through a slide buckle.

3. A collapsible bicycle carrier for use on a vehicle having a body and a hatch cover and adapted for carrying a bicycle having a pair of wheels and a frame, said carrier comprising:

a plurality of adjustable flexible lower support straps, each of said lower support straps being configured in an inverted Y shape, wherein a first end of said strap is adapted to secure said strap to said vehicle and comprises a flexible cylindrical section affixed thereto, said section having with a diameter significantly greater than a space between a body of the vehicle and a hatch cover and wherein each one of a remaining two ends of said support strap comprises a substantially "J" shaped section of rigid material formed into said strap end adapted to support a bicycle wheel and wherein adjustment of said straps is accomplished with a standard slide buckle;

a plurality of adjustable flexible upper support straps, each of said upper support straps having a first end adapted to secure said strap to said vehicle, said first end comprises a flexible cylindrical section affixed thereto and having a diameter significantly greater than a space between said body of said vehicle and said hatch cover and wherein a second end of each of said upper support straps is adapted to be attached to an upper portion of a frame of said bicycle by way of slide buckles through which said second end is slidably attached;

an adjustable pedal pad adapted to be removably affixed to a pedal of said bicycle immediately adjacent to said vehicle such that said pad is adapted to contact both said pedal and a surface on said vehicle;

an adjustable lower pedal support strap adapted to be removably affixed at a first end to a non-adjacent pedal on said bicycle and adapted to be removably affixed at a second end to a secure attachment point on a lower portion of said vehicle; and an adjustable brake lock device comprising a strap with securing means adapted to encircle a brake handle.

* * * * *